US 6,733,704 B2

(12) United States Patent
Seta et al.

(10) Patent No.: US 6,733,704 B2
(45) Date of Patent: May 11, 2004

(54) THERMOPLASTIC RESIN INJECTION MOLDING MACHINE

(75) Inventors: Kunihito Seta, Moriyama (JP); Takeshi Takeda, Omihachiman (JP)

(73) Assignee: Murata Manufacturing Co., Ltd., Nagaokakyo (JP)

(*) Notice: Subject to any disclaimer, the term of this patent is extended or adjusted under 35 U.S.C. 154(b) by 0 days.

(21) Appl. No.: 10/259,573

(22) Filed: Sep. 30, 2002

(65) Prior Publication Data
US 2003/0034577 A1 Feb. 20, 2003

Related U.S. Application Data

(62) Division of application No. 09/507,683, filed on Feb. 22, 2000, now Pat. No. 6,488,490.

(30) Foreign Application Priority Data

Mar. 11, 1999 (JP) .............................................. 11-64326

(51) Int. Cl.⁷ .............................................. B29C 45/77
(52) U.S. Cl. ................. 264/40.1; 264/328.19; 264/349; 425/207; 425/587
(58) Field of Search ................ 425/149, 205, 425/207, 208, 557, 558, 559, 587, 564; 264/328.19, 349, 40.1

(56) References Cited

U.S. PATENT DOCUMENTS

| 2,767,437 A | 10/1956 | Marshall |
| 3,354,507 A | 11/1967 | Orrevad |
| 3,649,147 A | 3/1972 | Fritsch |
| 4,461,734 A | 7/1984 | Jones et al. |
| 4,820,469 A | 4/1989 | Walsh et al. |
| 5,267,847 A | 12/1993 | Bohm et al. |
| 5,316,556 A | 5/1994 | Morris |
| 5,447,425 A | 9/1995 | Hsu et al. |
| 5,863,485 A | 1/1999 | Groleau |
| 6,252,034 B1 | 6/2001 | Uenishi et al. |

FOREIGN PATENT DOCUMENTS

| DE | 43 31 209 | 3/1995 |
| DE | 44 14 246 | 10/1995 |
| JP | 58-119808 | 7/1983 |
| JP | 62-3916 | 1/1987 |
| JP | 62-184825 | 8/1987 |
| JP | 62207622 | 9/1987 |
| JP | 63-3917 | 1/1988 |
| JP | 01320126 | 12/1989 |
| JP | 3-20126 | 2/1991 |
| JP | 6-63999 | 3/1994 |
| JP | 9-295329 | 11/1997 |

OTHER PUBLICATIONS

Rosato, Injection Molding Handbook, second edition, Chapman & Hall publisher, p. 28.*
U.S. Application No. 09/470,967, Kunihito Seta et al., filed Dec. 23, 1999.

* cited by examiner

Primary Examiner—Jill L. Heitbrink
(74) Attorney, Agent, or Firm—Burns, Doane, Swecker & Mathis, L.L.P.

(57) ABSTRACT

An injection molding machine includes a plasticating unit for plasticating a thermoplastic resin, and an injecting unit connected to the plasticating unit through a connecting passage to inject the plasticated resin into a mold. The injecting unit A includes a rotary pump having a suction port connected to the plasticating unit through the connecting passage and a discharge port connected to the mold. The plasticated resin is intermittently injected into the cavity of the mold through the injection port by means of the rotary pump. In the connecting passage, an accumulator is provided which reserves the resin plasticated in the plasticating unit in an amount equal to or more than the shot capacity, and feeds the resin to the rotary pump.

7 Claims, 5 Drawing Sheets

FIG. 1A
CONVENTIONAL

MOLDING CYCLE: WEIGHING = PLASTICATION | COOLING | MARGIN | OPENING-CLOSING OF MOLD

INJECTING — DWELLING

FIG. 1B
PRESENT INVENTION (CLAIM 4)

MOLDING CYCLE: PLASTICATION | COOLING | OPENING-CLOSING OF MOLD

INJECTING — DWELLING

DURING OPENING OF VALVE

DURING CLOSING OF VALVE

THERMOPLASTIC RESIN INJECTION MOLDING MACHINE

This application is a divisional of application No. Ser. No. 09/507,683, filed Feb. 22, 2000.

BACKGROUND OF THE INVENTION

1. Field of the Invention

The present invention relates to a thermoplastic resin injection molding machine, and more particularly to an injection molding machine of which the plasticating unit and the injecting unit are provided so as to be independent of each other.

2. Description of the Related Art

Conventionally, as an injection molding machine of which the plasticating unit for plasticating a thermoplastic resin and the injecting unit for injecting the plasticated resin into a metallic mold are provided so as to be independent of each other, screw replasticating type injection molding machines have been known. In the front of the injecting plunger of the injecting unit, a chamber, called a reservoir, for reserving a resin in an amount corresponding to one shot is formed. The resin plasticated by means of the plasticating unit is fed into the chamber, and injected into the mold by moving the injecting plunger forward.

In the case of such an injection molding machine, as the molding cycle, injection, dwelling, cooling, and mold-opening-closing are repeated in that order as shown in FIG. 1A. The plasticating unit is stopped during the injection, the dwelling, and the mold opening-closing. At the same time when the cooling process is started, the screw of the plasticating unit is driven so that the resin plasticated in the reservoir is fed, and synchronously, the injecting plunger is moved backward whereby the weighing is carried out.

The term "margin" means an excess time-period till the mold opening-closing is started after the cooling is completed, and is provided for the stabilization of the molding cycle. The time-period is changed correspondingly to the shot capacity.

As seen in the above-description, in the case of injection molding machines using an injecting plunger, it is required to determine optimal values with respect to the weighing and a molding pressure for each injecting molding machine and moreover, each of the molds if they are different from each other. Accordingly, the optimal values are determined by repeating the trial shot. Thus, these injection molding machines have the fault that it takes a long time to carry out the work for determining the optimal values.

Moreover, for a conventional injection molding machine, it is necessary to provide a space for a reservoir and a plunger-stroke. Thus, there has been the fault that the size of the injection molding machine is large as a whole.

SUMMARY OF THE INVENTION

Accordingly, it is an object of the present invention to provide a thermoplastic resin injection molding machine of which the weighing process is obviated, with which simplified, high precision injection molding is enabled, and which can be reduced in size.

To achieve the above-described object, according to the present invention, there is provided a thermoplastic resin injection molding machine which comprises a plasticating unit for plasticating a thermoplastic resin, and an injecting unit connected to the plasticating unit through a connecting passage to inject the plasticated resin into a mold through an injection port, the injecting unit including a rotary pump of which the suction side is connected to the plasticating unit through the connecting passage and the discharge side is connected to the injection port, whereby the plasticated resin is intermittently injected through the injection port by means of the rotary pump.

According to the present invention, as the injecting unit, the rotary pump is used. Therefore, the plasticated resin is discharged in one direction only, and it is unnecessary to provide the process of moving-backward, that is, the weighing process. In particular, it is unnecessary to determine an optimal value with respect to the weighing before hand, in contrast to a conventional injection molding machine. The weighing can be adjusted so as to have an optimal value only by controlling the rotation of the rotary pump. Thus, the work for repeating the trial shot to determine the optimal value can be obviated.

Further, in the case of the rotary pump, a motor, a rotary actuator, or the like may be used as a driving source. Accordingly, the driving source can be reduced in size as compared with a plunger which is reciprocated, and the necessary space can be decreased. Therefore, as a whole, the injection molding machine can be reduced in size.

As the rotary pump of the present invention, different types of rotary pumps such as a circumscribing gear pump, an inscribing gear pump, a trochoid pump, a vane pump, a screw pump, or the like can be employed. For example, when a circumscribing gear pump is used, desirably, a relatively high injection pressure can be attained, and moreover, an injection-performance is stable even at a high temperature.

For the purpose of attaining molding products of high quality, it is necessary to control the shot capacity and the injection pressure at a high precision. Conventionally, it has been necessary to determined optimal values with respect to the weighing and the injection pressure by trial shot. According to the present invention, the shot capacity can be continuously adjusted by the rotation of the rotary pump. Accordingly, molding products of high quality can be obtained by stopping the pump when the injection pressure reaches a predetermined value.

Thus, preferably, a pressure sensor is provided to detect an injection pressure in the mold, and the rotary pump is stopped when the injection pressure reaches a predetermined value. By controlling like this, the injection pressure in the mold can be controlled at a high precision, and molding products stable in qualities can be obtained.

Further, it is possible to control the injection pressure so as to have a predetermined value by no use of a pressure sensor. That is, a torque limiter may be provided on a driving shaft for driving the rotary pump to provide a slide when the torque exceeds a predetermined value. In this case, when the injection pressure exceeds a predetermined value, the torque limiter provides a slide. Therefore, even if the driving shaft of the rotary pump continues to be rotated, the injection pressure can be kept at a predetermined value. Hereupon, desirably, when the torque limiter provides a slide, the injection pressure is prevented from decreasing. As the torque limiter, means having the same function as a sliding clutch or the like are included.

When the plastication is carried out intermittently as in a conventional thermoplastic resin-injection molding machine (FIG. 1A), the plastication efficiency is ready to be reduced. Especially, for a resin having low engaging properties such as LCP, the reduction of the efficiency is remarkable.

On the other hand, according to the present invention, the weighing process is unnecessary. Therefore, it is not needed that the plastication process is synchronized with the weighing process. The plastication process can be converted to be an off-line as shown in FIG. 1B. That is, the plastication unit can be driven continuously during all the period of the molding cycle, and the plastication efficiency can be considerably enhanced. When the plastication is converted to be an off-line like this, the margin after the cooling, process is completed is unnecessary. Thus, the molding cycle can be significantly shortened as compared with the conventional one.

As described above, when the plastication unit is continuously driven, the pulsation of a resin is generated, caused by the intermittent injection of the rotary pump and the continuous supply by the plastication unit, so that stable injection can not be achieved. Accordingly, preferably, the connecting passage has the volume at which the pulsation of the resin, caused by the intermittent injection by the rotary pump and the continuous supply by the plasticating unit, can be absorbed. For example, stable injection is enabled by setting the volume of the connecting passage to be at least 100 times of the volume of the shot capacity. The qualities of molding products are enhanced.

For the purpose of absorbing the pulsation of the resin, caused by the intermittent injection by the rotary pump and the continuous supply by the plastication unit, preferably, in the connecting passage, disposed is an accumulator for reserving the resin plasticated with the plasticating unit, in the amount equal to or more than the shot capacity, and feeding the resin into the injecting unit. The accumulator has a simple structure, and is capable of reserving a large quantity of resin. Accordingly, the pulsation can be assuredly absorbed even if the shot capacity of the pump is increased.

Preferably, the accumulator is contained in the plasticating unit. That is, the plasticating unit comprises a cylinder, a screw disposed in the cylinder rotatably and movably in the axial direction, driving means for rotationally driving the screw, an accumulator chamber formed between the tip of the screw and the cylinder and being capable of reserving the plasticated resin in the amount equal to or more than the shot capacity, and actuating means for actuating the screw forward in the axial direction and feeding the resin in the accumulator, chamber to the injection unit. In this case, since the accumulator can be integrated with the plasticating unit in addition to the above-described advantage, that is, the assured absorption of the pulsation, the injection molding machine can be reduced in size. Moreover, since the plasticated resin does not stay in the accumulator chamber and is fed to the injecting unit sequentially, the deterioration of the resin is reduced. As the actuating means, a spring may be employed, or the resin in the accumulator chamber may be fed to the injecting unit by means of a pneumatic, hydraulic, or electric actuator.

According to the present invention, the rotary pump, the plasticating unit, and means for absorbing the pulsation of resin may be combined. In this case, the molding cycle can be shortened. Therefore, desirably, the present invention is applied to an injection molding machine of which the shot capacity is small (for example, 5 milliliter or less), that is, an injection molding machine of which the products quantity in a mold is small.

For the purpose of enhancing the productivity of injection molding, available are the following two methods. That is, the products quantity in a mold is increased, or the molding cycle is shortened. As to a conventional molding machine, it is necessary to synchronize the plastication with the weighing. Accordingly, the plastication can not be converted to an off-line, and the shortening of the molding cycle has a limitation. Accordingly, it has been dominant that the productivity is enhanced by increasing the products quantity in a mold, that is, by using a large-size mold. However, in the case of this method, the depreciation expense of the mold is high. In production of many kinds of products in small lots, which has been increasingly employed in recent years, there is caused the problem that the unit price of molding products is increased. Moreover, there has been the fault that since the injection pressure is increased, the required clamping force is high, and the clamping mechanism is large in size.

On the contrary, when the injection molding machine is employed with which the molding cycle is shortened, though the products quantity in a mold is small, the productivity comparable to that of a conventional injection molding machine can be assured though the mold is small in size, so that the depreciation expense of the mold can be significantly reduced. In addition, since a small-size mold having a small products-quantity in a mold is used, the injection pressure can be reduced, so that a sufficient injection pressure can be attained even by the rotary pump. Further, advantageously, the required clamping power is reduced, so that the mold-clamping mechanism, that is, the molding machine itself can be reduced in size, and the molding machine itself can be inexpensively formed.

Preferably, a nozzle is provided for the injection port of the injecting unit, and after the resin in the mold is cooled to be solidified, the rotary pump is driven reversely so that the residual pressure of the resin remaining the nozzle is removed. In this case, the resin in the nozzle can be prevented from leaking out when the mold is opened or closed.

Also preferably, a nozzle is provided for the injection port of the injecting unit, and a valve is provided to open or close the nozzle. In this case, the resin remaining in the nozzle can be also prevented from leaking out when the mold is opened or closed.

BRIEF DESCRIPTION OF THE DRAWINGS

FIGS. 1A and 1B illustrate for comparison the molding cycles of a conventional injection molding machine and the injection molding machine of the present invention;

DESCRIPTION OF THE PREFERRED EMBODIMENT

Figure 2:
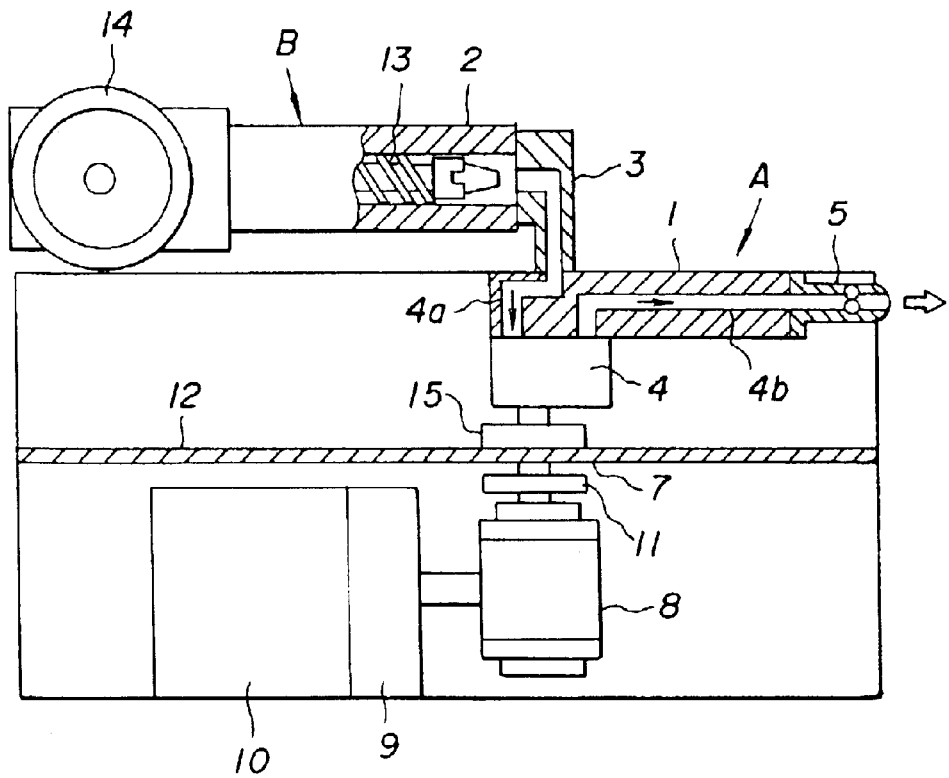
FIG. 2 illustrates the structure of an injection molding machine according to a first embodiment, of the present invention.

FIG. 2 shows a screw preplasticating injection molding machine according to a first embodiment of the present invention.

A plasticating cylinder 2 constituting a plasticating unit B is connected to a manifold 1 constituting an injecting unit A through a connecting passage 3 having a large volume. The manifold 1 and the cylinder 2 are heated at a predetermined resin melting temperature with a heater not illustrated.

Figure 3:
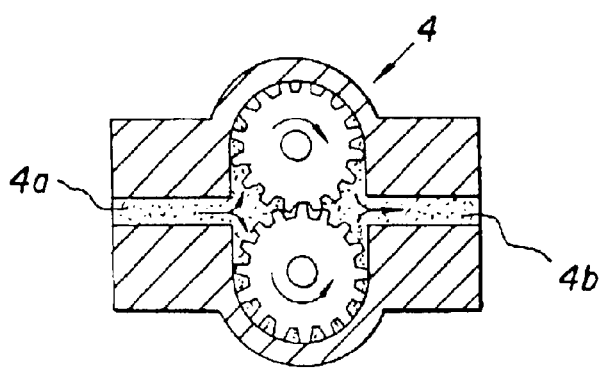
FIG. 3 is an enlarged cross section of the pump portion shown in FIG. 2.
Figure 4:
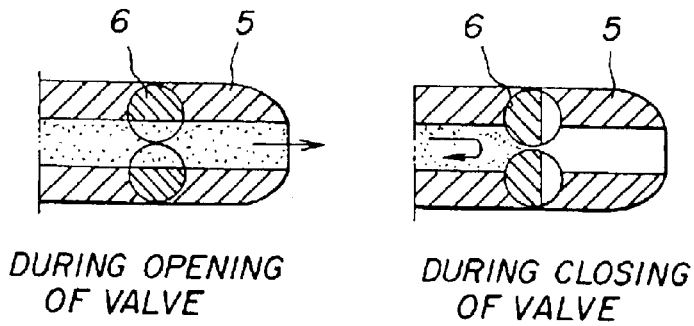
FIG. 4 is an enlarged cross section of the nozzle portion shown in FIG. 2 when it is opened and closed.

The manifold 1 is provided with a rotary pump 4 for discharge a plasticated resin into a mold and being capable of discharging the resin continuously. In this embodiment, as the rotary pump 4, a circumscribing gear pump as shown in FIG. 3 is used. In addition, an inscribing gear pump, a trochoid pump, a vane pump, a screw pump, or the like may be used. The suction port 4a of the gear pump 4 is connected to the plasticating unit B through the connecting passage 3, while the discharge port 4b is connected to a nozzle (injection port) 5. The nozzle 5 is provided with a closing valve 6 as shown in FIG. 4. The opening and closing of this valve 6 is synchronized with the intermittent driving of the gear pump 4, that is, the valve 6 is opened during injecting, and closed during off-injecting, so that the off-injecting, so that the off-properties of the resin from the nozzle 5 is enhanced.

The gear pump 4 is connected to a rotary actuator 10 through a drive shaft 7, a gear box 8 and a one-way clutch 9. The drive shaft 7 is provided with a torque limiter 15 and a brake 11 for stopping the pump. The torque limiter 15 causes sliding when the torque exceeds a predetermined value. The torque at which sliding is caused is set correspondingly to a target injection pressure. The reciprocating rotation of the rotary actuator 10 is converted to the intermittent rotation in one way by means of the one-way clutch 9. The rotation of the rotary actuator 10 is limited by means of a gear box 8 so that the discharge of the gear pump 4 is up to 1% of the volume of the connecting passage 3. Thereby, the pulsation of resin, caused by the intermittent injection by the gear pump 4 and the continuous supply by the plasticating unit 2 can be absorbed by the volume of the connecting passage 3. A heat-insulating plate 12 is provided to protect the gear box 8 and the rotary actuator 10 against heat.

A rotating plasticating screw 13 is equipped inside of the plasticating cylinder 2. A hopper 14 is connected to the back of the plasticating cylinder 2. A resin material is charged through the hopper 14 into the cylinder 2, where the resin material is melted and simultaneously kneaded with the screw 13. A screw-driving motor (not illustrated) is provided at the back of the plasticating cylinder 2 to drive the screw 13 continuously.

Hereupon, the operation of the injection molding machine having the above-described structure will be described.

First, a thermoplastic resin, charged through the hopper 14, is melted and plasticated by means of the plasticating unit B. The plasticating unit B is continuously driven during all the period of the molding cycle. The melted resin is extruded forward along the spiral of the screw 13, and fed into the suction port 4a of the gear pump 4 through the connecting passage 3.

Hereupon, the rotary actuator 10 is reciprocating-rotated at a constant cycle, and the power is transmitted to the gear pump 4 through the one-way clutch 9, the gear box 8, and the drive shaft 7. Thereby, the melted resin can be discharged through the discharge port 4b of the gear pump 4 in an arbitrary amount at an arbitrary pressure. While this discharge operation is carried out, the reciprocating motion of the rotary actuator 10 is converted to the intermittent rotational motion in one direction by means of the one-way clutch 9. Accordingly, the resin is intermittently discharged.

The discharged resin, passing through the flow passage in the manifold 1 and then the valve 6 which is opened is injected into a mold (not illustrated) through the nozzle 5.

As described above, it is unnecessary for the gear pump 4 to move backward (weighing) as in the case of a conventional injecting plunger. The plastication process can be converted to be an off-line with respect to the molding processes such as the mold opening-closing, the injection, and the cooling. Thus, the plastication can be carried out continuously. For this reason, even a resin such as LCP which has low screw-engaging properties can be efficiently plasticated. Further, the plastication process exerts no influence over the molding cycle, and the molding cycle can be considerably shortened as compared with a conventional molding cycle (see FIG. 1).

The power of the rotary actuator 10 is transmitted to the gear pump 4 through the one-way clutch 9. Accordingly, when the pressure on the suction side of the gear pump 4 is higher than that on the discharge side, the resin is discharged through the discharge port 4b, irrespective of the operation of the rotary actuator 10. In order to prevent this, the drive shaft 7 is fixed by means of the brake 11, so that the motion of the gear pump 4 is controlled to stop when the resin is not injected. Further, the brake 11 has the function of stopping the motion of the gear pump 4 to prevent the gear pump 4 from rotating reversely, when a counterpressure acts on the gear pump 4 from the mold side.

In this embodiment, resin is continuously supplied from the plasticating unit B while the gear pump 4 carries out the intermittent discharge. Accordingly, there is caused the problem that the resin pulsates between the plasticating unit B and the gear pump 4. However, the pulsation is inhibited by increasing the volume of the connecting passage 3 and limiting the resin discharge amount per cycle of the gear pump 4 to 1% or less of the volume of the connecting passage 3. Moreover, since the melted resin is a compressive fluid such as LCP, the variation in pressure on the suction side does note substantially affect the discharge pressure. Thus, injection can be carried out with stability.

Figure 5:
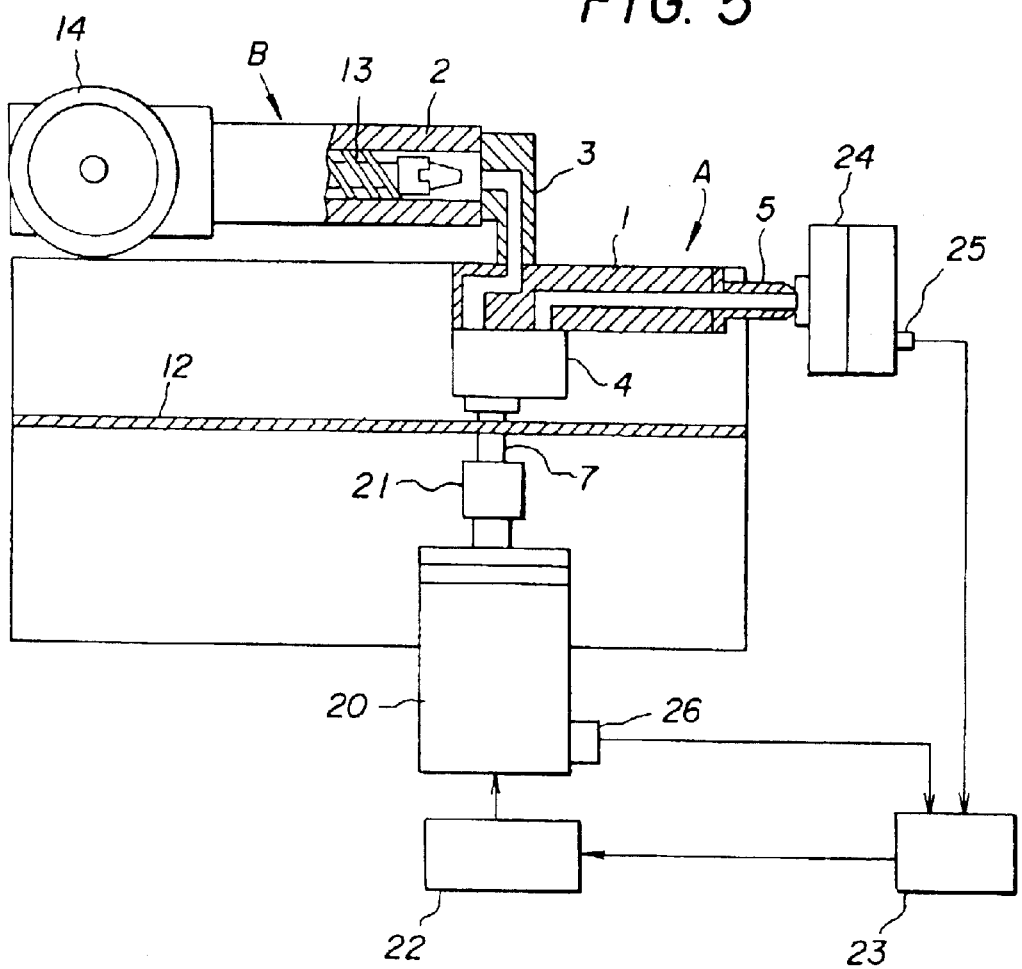
FIG. 5 illustrates the structure of an injection molding machine according to a second embodiment of the present invention.

FIG. 5 shows an injection molding machine according to a second embodiment of the present invention. Like parts in the first, second embodiments are designated by the same reference numerals, and the description will be omitted.

In this embodiment, as the power source for a gear pump 4, a servomotor 20 having a brake is employed, and drives the gear pump 4 through a drive shaft 7 and a coupling 21. To a driver 22 for controlling the servomotor, a control signal is input from a controller 23. To the controller 23, a detecting signal from a pressure sensor 25 disposed at a mold 24 is input. Also, to the controller 23, a detecting signal from a rotational angle sensor 26 for detecting the rotational angle of the servomotor 20 is input. The rotational angle sensor 26 is used to detect the starting point of the servomotor 20 when the next injection is carried out. The shot capacity and the pressure of a resin are controlled so as to have optimal values by controlling the servomotor 20 and also the gear pump 4 based on the resin pressure value of the mold 24.

The servomotor 20 can be rotated in either one of the normal, reverse directions. Therefore, the falling of the resin through the nozzle 5 occurring when the injection is not carried out can be prevented by rotating the gear pump 4 in the reverse direction for a short time after the injection and the dwelling are carried out so that the residual pressure in the nozzle 5 is reduced. In this case, it is unnecessary to provide the valve 6 for the nozzle 5 as described in the first embodiment.

Figure 6:
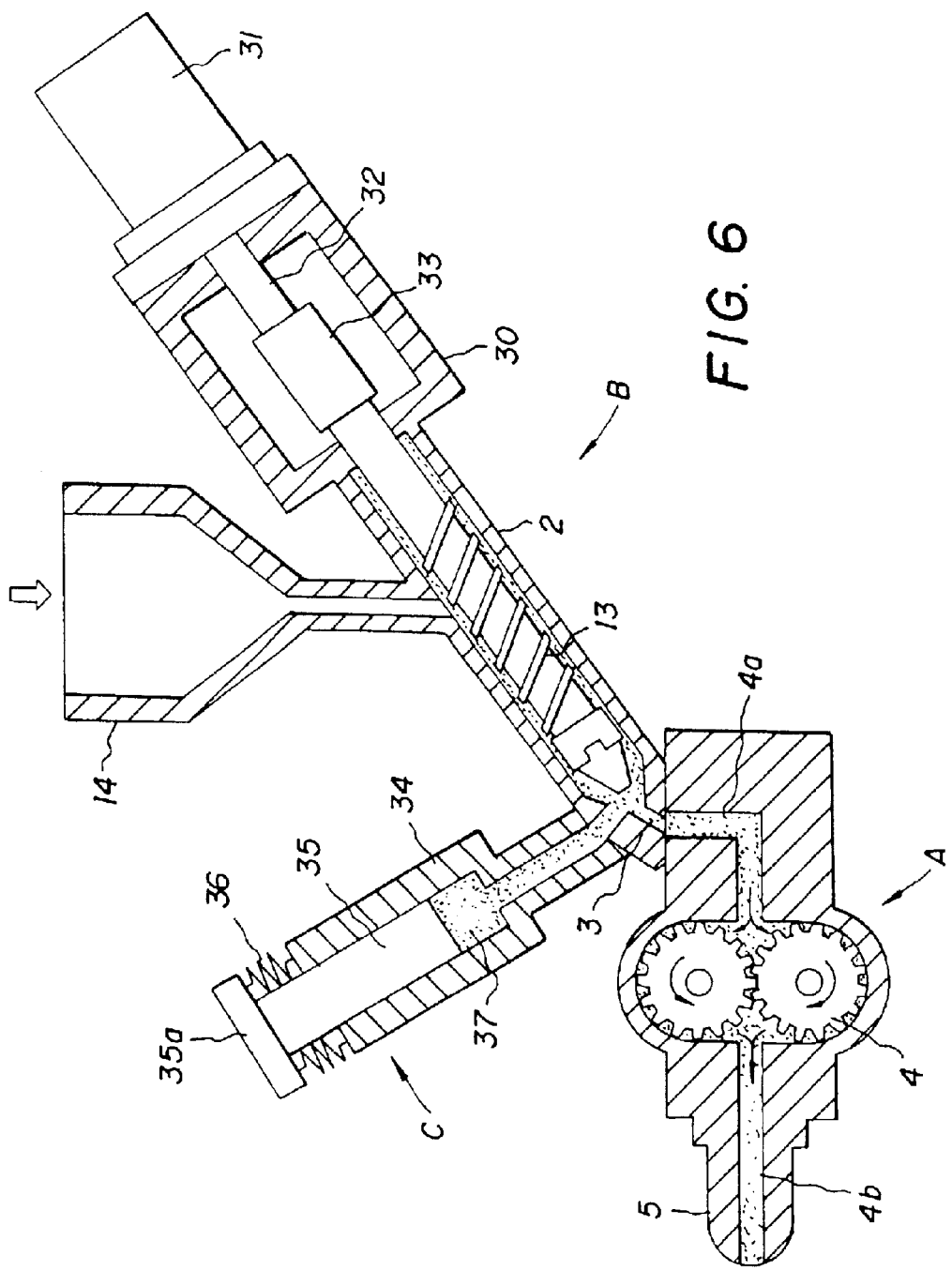
FIG. 6 is a schematic cross section of an injection molding machine according to a third embodiment of the present invention.

FIG. 6 shows an injection molding machine according to a third embodiment of the present invention. Like parts in the first and third embodiments are designated by the same reference numerals, and the description will be omitted.

A screw-driving motor 31 is fixed to the back of a plasticating cylinder 2 through a motor-fixing sleeve 30. The rotational shaft 32 of a motor 31 is connected to a rotary plasticating screw 13 through a joint 33.

An accumulator C is provided in a connecting passage 3 for connecting a manifold 1 on the suction port 4a side of a gear pump 4, to the plasticating cylinder 2. The accumulator C comprises a pot 34 connected to the plasticating cylinder 2, a plunger 35 inserted into the pot 34 reciprocatably in the pot 34, and a spring 36 provided between the pot 34 and a pressing plate 35a on the rear-end of the plunger 35 to actuate the plunger 35 forward. The accumulator C is also heated at a predetermined temperature, together with an injecting unit A and the plasticating unit B, so that the resin can be kept in the melted state. An accumulator chamber 37 is formed between the pot 34 and the tip of the plunger 35 so as to have a volume larger than the shot capacity.

In the case of the injection molding machine having the above-described structure, the plasticating unit B is continuously driven during a series of the molding cycle, while the injecting unit A (gear pump 4) is intermittently driven. Accordingly, the resin pressure in the connecting passage 3 connecting the plasticating unit B to the injecting unit A is considerably pulsated. However, the pulsation is absorbed by the accumulator C. Especially in this embodiment, the pulsation can be assuredly absorbed even if the shot capacity is large or the melted resin is non-compressive, since the accumulator C has a sufficient volume. That is, the injection molding can be achieved with stability.

Figure 7:
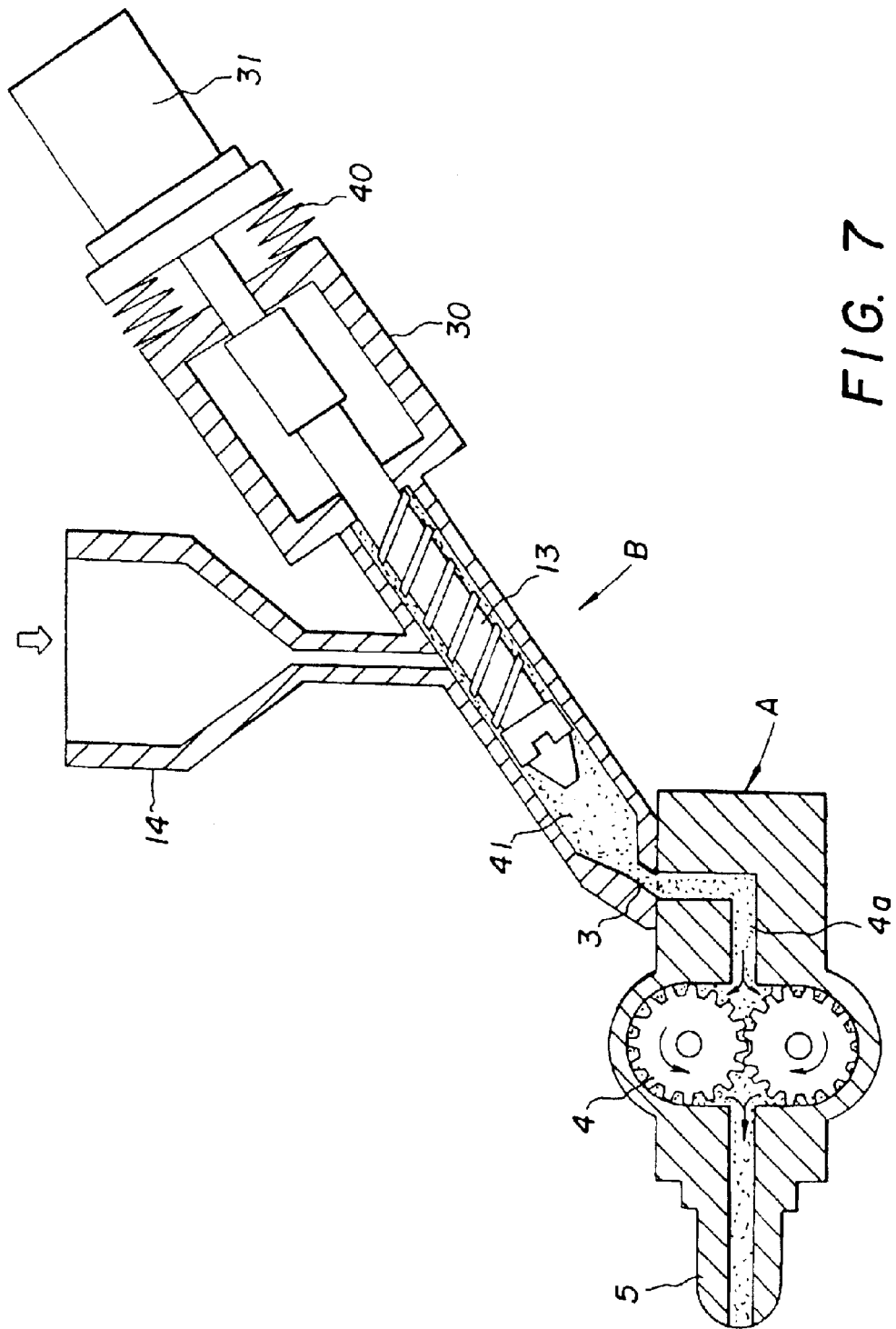
FIG. 7 is a schematic cross-section of an injection molding machine according to a fourth embodiment of the present invention.

FIG. 7 shows an injection molding machine according to a fourth embodiment of the present invention. Like parts in the third and fourth embodiments are designated by the same reference numerals, and the description will be omitted.

In this embodiment, an accumulator is contained in a plasticating unit B. In the plasticating unit B, a screw 13 is disposed in a plasticating cylinder 2 rotatably and movably in the axial direction. A motor-fixing sleeve 30 and a plasticating screw driving motor 31 are separated from each other, and between both of them, a spring 40 for actuating the motor 31 forward is interposed. That is, the screw 13 is actuated forward by means of the spring 40. An accumulator chamber 41 capable of reserving a plasticated resin in an amount equal to or larger than the shot capacity is formed between the tip of the screw 13 and the cylinder 2, caused by the backward movement of the screw 13.

Also in this embodiment, a resin plasticated continuously by means of the plasticating unit B is reserved in the accumulator chamber 41. The screw 13 is moved backward as the reserved resin quantity is increased. Hereupon, the spring 40 is elongated, so that the resin pressure in the accumulator chamber 41 is kept substantially constant. When a gear pump 4 is intermittently driven for injection, the melted resin in the accumulator chamber 41 is fed to the suction port 4a, so that the pulsation is prevented.

In this example, the injection molding machine can be reduced in size, since the accumulator is integrated with the plasticating unit B. In addition, the resin plasticated in the accumulator chamber 41 is fed to the gear pump 4 sequentially from the tip side of the resin. Thus, the plasticated resin is prevented from staying in the accumulator chamber 41 for a long time, and the deterioration of the resin is reduced.

The present invention is not limited onto the above-described embodiments, and needless to say, various modifications are possible.

In the first through fourth embodiments, the screw preplasticating injection molding machine is described. The present invention may be applied to injection molding machines of other modes (for example, plunger preplasticating type), provided that an injection molding machine includes a plasticating unit and an injecting unit which are independent of each other.

Further, another injection molding machine can be formed by changing the combination of the components described in the first through fourth embodiments. For example, in the connecting passage of the injection molding machine (see FIG. 2) of the first embodiment, the accumulator C of the third embodiment (FIG. 6) may be disposed. Further, as the plasticating unit, the plasticating unit B of the fourth embodiment (FIG. 7) may be applied.

As seen in the above description, the rotary pump is employed in the injecting unit according to the present invention. Accordingly, the weighing process is unnecessary in contrast to a conventional plunger type injecting unit. Thus, it is unnecessary to determine an optimal value with respect to the weighing before hand. The weighing can be arbitrarily controlled so as to have the optimal value only by controlling the rotation of the rotary pump, and the injection molding can be carried out with stability. Moreover, for driving the rotary pump, it is unnecessary to provide a large driving source. Thus, the injection molding machine can be reduced in size as a whole.

Preferably, by stopping the injection by the rotary pump in correspondence to the injection pressure, the injection molding can be carried out at a high precision only by controlling the pressure, without the conventional complicate control which has been made based on the weighing and the molding pressure.

In the case that the rotary pump, the plasticating unit to be driven continuously, and means for absorbing the pulsation of a resin are combined according to the present invention, the plastication can be carried out in parallel to a series of the molding cycle. Accordingly, the plastication efficiency can be enhanced, and moreover, the molding cycle can be shortened.

What is claimed is:

1. A method of using a thermoplastic resin injection molding machine having a plasticating unit for plasticating a thermoplastic resin, and an injecting unit connected to the plasticating unit through a connecting passage to inject the plasticated resin into a mold through an injection port, the injecting unit including a rotary pump having a suction side connected to the plasticating unit through the connecting passage and a discharge side connected to the injection port, the method comprising the steps of:

plasticating resin with the plasticating unit;
   flowing the plasticated resin through the connecting passage to the injecting unit;
   intermittently injecting the plasticated resin through the injection port by the rotary pump; and
   limiting the torque by a torque limiter provided on a driving shift for driving the rotary pump to provide a slide when the torque exceeds a predetermined value, whereby injection pressure is prevented from decreasing.

2. A method in accordance with claim 1, wherein a pressure sensor is provided in the mold to detect an injection pressure, and further comprising:

stopping the rotary pump when the injection pressure reaches a predetermined value.

3. A method in accordance with claim 1, wherein the step of plasticating resin comprises continuously plasticating resin during all the period of the molding cycle.

4. A method in accordance with claim 3, wherein the step of intermittently injecting resin comprises intermittently injecting a volume of resin selected relative to a volume of the connecting passage so that the connecting passage absorbs pulsation of the resin caused by the intermittent injection by the rotary pump and the continuous supply by the plasticating unit.

5. A method in accordance with claim 3, wherein the mold has a shot capacity, and further comprising the step of:

reserving resin plasticated with the plasticating unit in an accumulator in the connecting passage in an amount equal to or more than the shot capacity.

6. A method in accordance with claim 1, wherein a nozzle is provided for an injection port of the injecting unit, and further comprising the step of:

driving the rotary pump reversely after the resin in the mold is cooled so that residual pressure of the resin remaining in the nozzle is removed.

7. A method in accordance with claim 1, wherein a nozzle is provided for an injection port of the injecting unit, and a valve is provided in the nozzle, and further comprising the step of:

controlling the valve to open or close the nozzle.

* * * * *